US009076274B2

United States Patent
Kamiya

(10) Patent No.: US 9,076,274 B2
(45) Date of Patent: Jul. 7, 2015

(54) DOOR COURTESY SWITCH ABNORMALITY DETECTION APPARATUS AND METHOD

(75) Inventor: Masachika Kamiya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 91 days.

(21) Appl. No.: 12/863,023

(22) PCT Filed: Nov. 27, 2008

(86) PCT No.: PCT/JP2008/071574
§ 371 (c)(1),
(2), (4) Date: Jul. 15, 2010

(87) PCT Pub. No.: WO2010/061463
PCT Pub. Date: Jun. 3, 2010

(65) Prior Publication Data
US 2011/0054735 A1 Mar. 3, 2011

(51) Int. Cl.
*G06F 7/00* (2006.01)
*G07C 9/00* (2006.01)
*B60R 25/24* (2013.01)

(52) U.S. Cl.
CPC .......... *G07C 9/00309* (2013.01); *B60R 25/245* (2013.01); *B60R 25/246* (2013.01); *G07C 2009/00793* (2013.01); *G07C 2209/63* (2013.01)

(58) Field of Classification Search
CPC .......... G06F 7/00; G06F 17/00; G06F 13/14; G06F 3/0484; G06F 3/0488; G06F 11/00; G08C 17/02; B60R 25/04; B60R 25/24; B60R 25/241; B60R 25/243; G07C 9/00309
USPC .............................................. 701/36
See application file for complete search history.

(56) References Cited

U.S. PATENT DOCUMENTS

| 6,304,168 B1 * | 10/2001 | Ohta et al. ................ 340/5.72 |
| 6,573,615 B1 * | 6/2003 | Asakura et al. ............ 307/9.1 |
| 6,575,003 B1 * | 6/2003 | Dupont ........................ 70/257 |
| 2004/0104815 A1 | 6/2004 | Suyama et al. |

(Continued)

FOREIGN PATENT DOCUMENTS

EP    1 638 063 A2   3/2006
JP    A 2001-303827   10/2001

(Continued)

OTHER PUBLICATIONS

International Search Report issued in corresponding International Application No. PCT/JP2008/071574, mailed Feb. 24, 2009. (with English-language translation).

(Continued)

Primary Examiner — Florian Zeender
Assistant Examiner — Fawaad Haider
(74) Attorney, Agent, or Firm — Oliff PLC

(57) ABSTRACT

A door courtesy switch abnormality detection apparatus used in an on-vehicle system in which a door unlocked status is formed based on a wireless signal transmitted from an electronic key is disclosed. The apparatus is configured to generate information representing an abnormality in the door courtesy switch, if the electronic key in a cabin of a vehicle is detected by an antenna having the detection area thereof within the cabin of the vehicle in a situation where an ON/OFF signal of the door courtesy switch is not inverted after the door unlock operation is detected.

11 Claims, 7 Drawing Sheets

(56) References Cited

U.S. PATENT DOCUMENTS

| | | | |
|---|---|---|---|
| 2005/0040933 A1* | 2/2005 | Huntzicker | 340/5.64 |
| 2007/0109106 A1* | 5/2007 | Maeda et al. | 340/426.1 |
| 2008/0195273 A1 | 8/2008 | Matsuura et al. | |

FOREIGN PATENT DOCUMENTS

| | | | |
|---|---|---|---|
| JP | A 2003-297166 | 10/2003 | |
| JP | A 2003-301638 | 10/2003 | |
| JP | A 2004-027490 | 1/2004 | |
| JP | A 2004-359057 | 12/2004 | |
| JP | A 2005-139657 | 6/2005 | |
| JP | A 2005-139671 | 6/2005 | |
| JP | A 2006-089946 | 4/2006 | |
| JP | A 2006-105049 | 4/2006 | |

OTHER PUBLICATIONS

Jun. 6, 2012 Supplementary Partial Search Report issued in European Patent Application No. 08878420.2.

* cited by examiner

DOOR COURTESY SWITCH ABNORMALITY DETECTION APPARATUS AND METHOD

TECHNICAL FIELD

The present invention relates to a door courtesy switch abnormality detection apparatus and a method used in an on-vehicle system in which a door unlocked status is formed based on a wireless signal transmitted from an electronic key.

BACKGROUND ART

A keyless entry system is well known in which doors of vehicle are locked or unlocked if the system receives a wireless signal which is transmitted when a switch of a mobile terminal (i.e., an electronic key) is operated by a user and an ID code included in the wireless signal is valid.

Recently, a smart key system is known from JP2004-359057 A, for example in which the system performs a bidirectional communication with feeble electromagnetic waves between a transmitter-receiver installed in the vehicle and the mobile terminal, detects an approach of a valid user toward the vehicle by ascertaining the ID code of the mobile terminal, and unlocks the doors of the vehicle concurrently with a detection of an operation of a door outer handle. In such a type of a smart key system, the communication is also performed after the user opens and closes the door, and if the valid ID code of the electronic key is ascertained again, an immobilizer function is deactivated and a steering wheel lock is released. After that, the user can turn on an ignition switch by manually operating a dial switch or the like to start an engine without inserting the electronic key into an ignition cylinder. Further, in this smart key system, the communication is also performed when the user turns off the ignition switch and then opens and closes the door, and if the electronic key with the valid ID code is detected to move away from the vehicle, the above-mentioned various devices are locked. In this way, in the smart key system, if the user has the electronic key, various manual operations using the electronic key become unnecessary and thus the convenience is enhanced.

In such the smart key system, since the communication with the electronic key is performed on the condition that the user rides in or gets out of the vehicle (accompanied by opening and closing operations of the door) as mentioned above, it becomes an important factor to determine whether the opening and closing operations of the door are performed. In particular, recently, such a system is proposed in which an operation of a motorized steering wheel lock is performed in connection with the detection of the opening and closing operations of the door, and thus information from a door courtesy switch is utilized to implement more functions.

In general, the opening and closing operations of the door is detected based on an ON/OFF signal of the door courtesy switch which is attached to the door, etc. An abnormality (including a failure) of the door courtesy switch causes an abnormality of a system which uses the information from the door courtesy switch, and further may cause a key trapped situation in which doors are locked due to an automatic lock function, for example, while leaving the key in a cabin of the vehicle. It is noted that the automatic lock function is a function which automatically performs the door lock operation if a predetermined time period (30 sec, for example) has passed without the opening and closing operations of the door being detected after the door unlock operation is performed in connection with a wireless signal in the keyless entry system or the smart entry system, for example. Normally, if the door courtesy switch is normal, the automatic lock function is not activated even if the user unlocks the door, opens the door to get out of the vehicle, closes the door while leaving the key in a cabin of the vehicle, and moves away from the vehicle in order to go back home for getting something the user left, for example. However, if there is an abnormality of the door courtesy switch, the opening and closing operations of the door by the user is not detected and thus the above-mentioned key trapped situation may occur.

JP2003-297166 A discloses a door courtesy switch abnormality detection method in which the door courtesy switch is configured in such a manner that a voltage status of a wire harness connected to the door courtesy switch becomes different between an abnormal state and a normal state. In this arrangement, whether the door courtesy switch is normal or abnormal (i.e., open circuit and short circuit of the wire harness) is detected by monitoring the voltage status of the wire harness.

A permanent abnormality of the door courtesy switch such as open circuit and short circuit of the wire harness can be detected by an ordinary diagnostic tester. On the other hand, a connection failure or the like of the door courtesy switch is likely to occur temporarily. For example, there are many cases where a connection failure or the like of the door courtesy switch occurs temporarily due to a foreign substance involved or a hardening of grease at low temperature. Such type of abnormalities is not likely to be detected by the diagnostic tester. However, even such a temporary abnormality may cause an abnormality of a system which uses the information from the door courtesy switch, and detection of such a temporary abnormality is useful in terms of abnormality analysis.

DISCLOSURE OF INVENTION

Therefore, an object of the present invention is to provide a door courtesy switch abnormality detection apparatus and a method used in an on-vehicle system which can accurately detect even temporary abnormality of the door courtesy switch.

In order to achieve the aforementioned objects, according to the first aspect of the present invention, a door courtesy switch abnormality detection apparatus used in an on-vehicle system is provided in which a door unlocked status is formed based on a wireless signal transmitted from an electronic key. The door courtesy switch abnormality detection apparatus comprises:

unlock detecting means configured to detect a door unlock operation;

door open/close operation detecting means configured to detect door open and close operations based on an ON/OFF signal from a door courtesy switch;

information generating means configured to generate information representing an abnormality in the door courtesy switch; and unlocking time key determining means for determining whether the electronic key exists in a cabin of a vehicle based on a status of a radio wave transmitted from the electronic key under a situation where the door open operation is not detected by the door open/close operation detecting means, in the case of the door unlock operation being detected by the unlock detecting means, wherein the information generating means generates the information representing the abnormality in the door courtesy switch if it is determined by the unlocking time key determining means that the electronic key exists in the cabin of the vehicle.

According to the present invention, it is possible to obtain a door courtesy switch abnormality detection apparatus and a method used in an on-vehicle system which can accurately detect even temporary abnormality of the door courtesy switch.

BRIEF DESCRIPTION OF THE DRAWINGS

These and other objects, features, and advantages of the present invention will become more apparent from the following detailed description of preferred embodiments given with reference to the accompanying drawings, in which.

Figure 1:
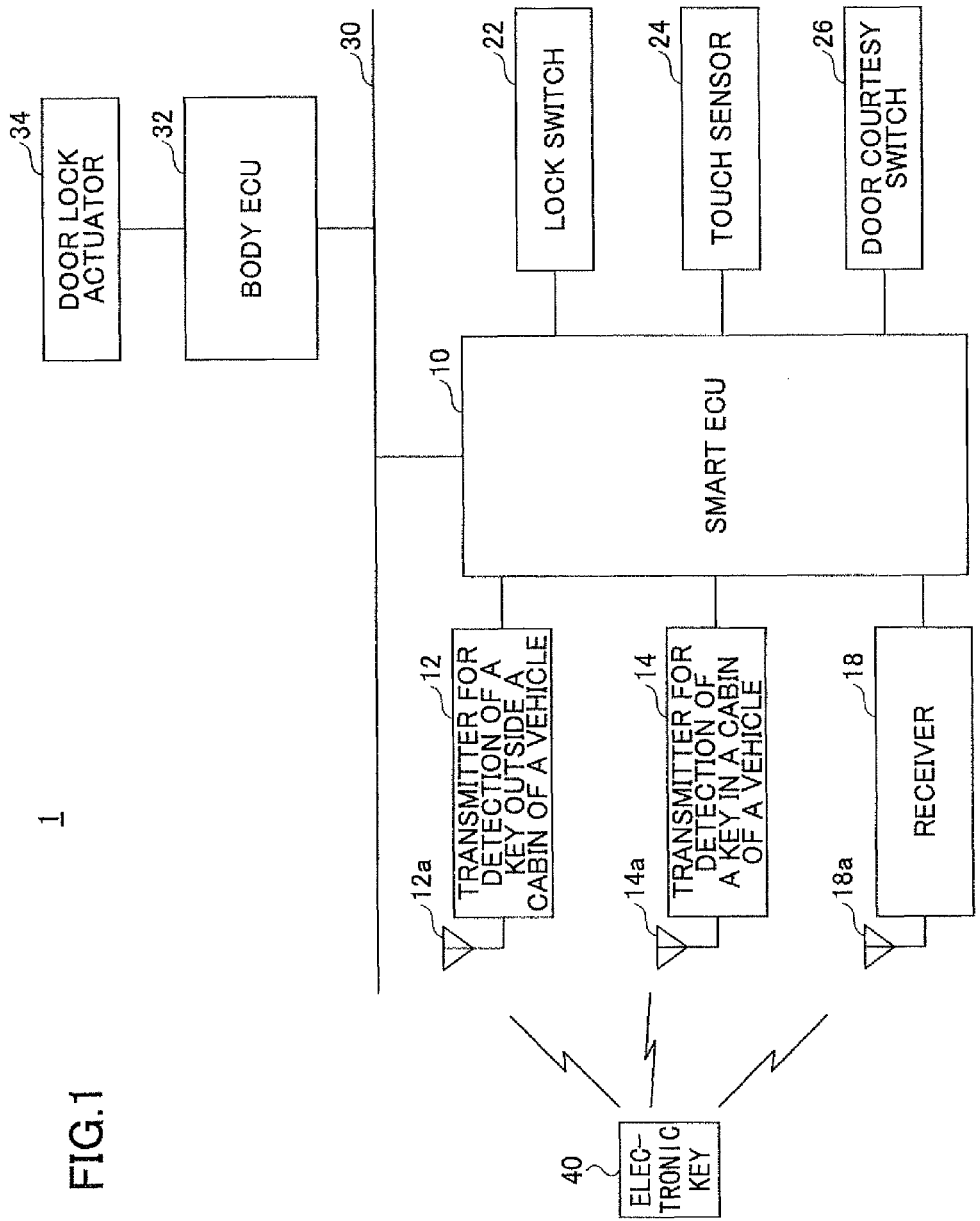
FIG. 1 is a diagram of a system as a whole into which an embodiment of a door courtesy switch abnormality detection apparatus 1 according to the present invention is incorporated.

EXPLANATION FOR REFERENCE NUMBER 1 door courtesy switch abnormality detection apparatus
10 smart ECU
12 transmitter for detection of a key outside a cabin of a vehicle
12a antenna for detection of a key outside a cabin of a vehicle
14 transmitter for detection of a key in a cabin of a vehicle
14a antenna for detection of a key in a cabin of a vehicle
18 receiver
22 lock switch
24 touch sensor
26 door courtesy switch
30 bidirectional multiplex transmission line
32 body ECU
34 door lock actuator
40 electronic key

BEST MODE FOR CARRYING OUT THE INVENTION

In the following, the best mode for carrying out the present invention will be described in detail by referring to the accompanying drawings.

FIG. 1 is a diagram of a system as a whole into which an embodiment of a door courtesy switch abnormality detection apparatus 1 according to the present invention is incorporated.

The door courtesy switch abnormality detection apparatus 1 mainly includes a smart ECU 10 for controlling a smart key system and a body ECU 32. The smart ECU 10 and the body ECU 32 are comprised mainly of a microprocessor that includes a CPU, a ROM, a RAM, etc., (not shown) which are interconnected via appropriate buses, respectively. In the ROM are stored the computer readable programs to be carried out by the CPU.

Door courtesy switches 26 are connected to the smart ECU 10. The door courtesy switches 26 are provided in association with the respective doors (including a luggage door) of the vehicle. The output signals of the respective door courtesy switches 26 are transmitted to the smart ECU 10. The door courtesy switch 26 is in its ON state when the door is open and is in its OFF state when the door is closed. However, in an alternative embodiment, the door courtesy switch 26 may be in its OFF state when the door is open and is in its ON state when the door is closed. The door courtesy switch 26 may be attached to the door or a body of the vehicle, or may be a type of a switch which is incorporated in a door lock actuator 34. Further, the door courtesy switch 26 may be a type of a switch whose electric contact is turned on or off in a mechanically interlocked manner with the opening and closing operations of the door.

The smart ECU 10 is connected to a transmitter 12 (refereed to as an outside key detecting transmitter 12 hereafter) for detection of a key outside a cabin of a vehicle. The outside key detecting transmitter 12 forms a detection area outside the vehicle for detecting an electronic key 40. The outside key detecting transmitter 12 includes an antenna 12a (refereed to as an outside key detecting antenna 12a hereafter) for detection of a key outside a cabin of a vehicle. The outside key detecting transmitter 12 forms the detection area for detecting the electronic key 40 by transmitting a request signal via the outside key detecting antenna 12a. Here, an area, within which the request signal transmitted from the outside key detecting antenna 12a can reach the electronic key 40 in such a manner that it is normally received by the electronic key 40, corresponds to the detection area of the outside key detecting transmitter 12 (or the outside key detecting antenna 12a). It is noted that a plurality of the outside key detecting transmitters 12 and the outside key detecting antennas 12a may be provided. For example, each set of the outside key detecting transmitter 12 and the outside key detecting antenna 12a may be incorporated in a door outer handle on a left side and a door outer handle on a right side, respectively, to cover space outside the door on a driver seat side of the vehicle and space outside the door on a passenger seat side of the vehicle, respectively.

The smart ECU 10 is connected to a transmitter 14 (refereed to as an inside key detecting transmitter 14 hereafter) for detection of a key inside a cabin of a vehicle. The inside key detecting transmitter 14 forms a detection area inside the vehicle for detecting an electronic key 40. The inside key detecting transmitter 14 includes an antenna 14a (refereed to as an inside key detecting antenna 14a hereafter) for detection of a key inside a cabin of a vehicle. The inside key detecting transmitter 14 forms the detection area for detecting the electronic key 40 by transmitting a request signal via the inside key detecting antenna 14a. Here, an area, within which the request signal transmitted from the inside key detecting antenna 14a can reach the electronic key 40 in such a manner that it is normally received by the electronic key 40, corresponds to the detection area of the inside key detecting transmitter 14 (or the inside key detecting antenna 14a). It is noted that a plurality of the inside key detecting transmitters 14 and the inside key detecting antennas 14a may be provided. For example, three sets of the inside key detecting transmitter 14 and the inside key detecting antenna 14a may be provided to cover front seat space of the vehicle, rear seat space of the vehicle and luggage space of the vehicle, respectively.

The smart ECU 10 is connected to a receiver which receives a response signal (i.e., a transmitted radio wave) from the electronic key 40. The receiver 18 is arranged in such a position where the receiver 18 can receive the response signal transmitted from the electronic key 40 located in the detection area of the outside key detecting transmitter 12 and the outside key detecting antenna 12*a*. For example, the receiver 18 may be arranged on the side of the rear seat of the vehicle. The receiver 18 may include an additional receiver disposed in the luggage space. The number and the location of the receiver 18 may be arbitrary. When the receiver 18 receives the response signal from the electronic key 40, the receiver 18 performs predetermined processes such amplification, demodulation, etc., of the response signal received from the electronic key 40, and supplies the smart ECU 10 with the demodulated response signal. The smart ECU 10 compares an encryption code included in the received response signal with an encryption code stored in a predetermined memory (not shown). Then, if these encryption codes correspond to each other, the smart ECU 10 outputs a certification result representing that the electronic key 40 is a valid key (i.e., a key certification is granted).

The electronic key 40 includes a transmitter-receiver (transponder) for performing bidirectional communication with the transmitter-receivers of the vehicle (such as elements, 12, 14, 18, etc.) using feeble electromagnetic waves, and a transmit/receive antenna. The electronic key 40 has a memory incorporated therein for storing a given valid encryption code (ID code). It is noted that the electronic key 40 includes a switch (button) to be operated by a user and the electronic key 40 may have a function of transmitting a wireless signal to instruct the door lock/unlock operation in response to the operation of the switch. Further, the electronic key 40 may be a key in which a mechanical key, which can lock and unlock the doors of the vehicle by operations of the user, is incorporated. Alternatively, the electronic key 40 may be a key independent from the mechanical key.

When the electronic key 40 receives the request signal transmitted via the outside key detecting antenna 12*a* as described above, the electronic key 40 transmits the response signal in response to the request signal. This response signal includes a code, which represents that this is the response to the outside key detecting antenna 12*a*, in addition to the encryption code. Further, when the electronic key 40 receives the request signal transmitted via the inside key detecting antenna 14*a* as described above, the electronic key 40 transmits the response signal in response to the request signal. This response signal includes a code, which represents that this is the response to the inside key detecting antenna 14*a*, in addition to the encryption code. In this way, the electronic key 40 is configured to transmit different response signals between when the electronic key 40 receives the request signal transmitted via the outside key detecting antenna 12*a* and when the electronic key 40 receives the request signal transmitted via the inside key detecting antenna 14*a* as described above. With this arrangement, the smart ECU 10 can determine whether the electronic key 40 exists inside the cabin or outside the cabin by decoding the response signal from the electronic key 40.

Figure 2:
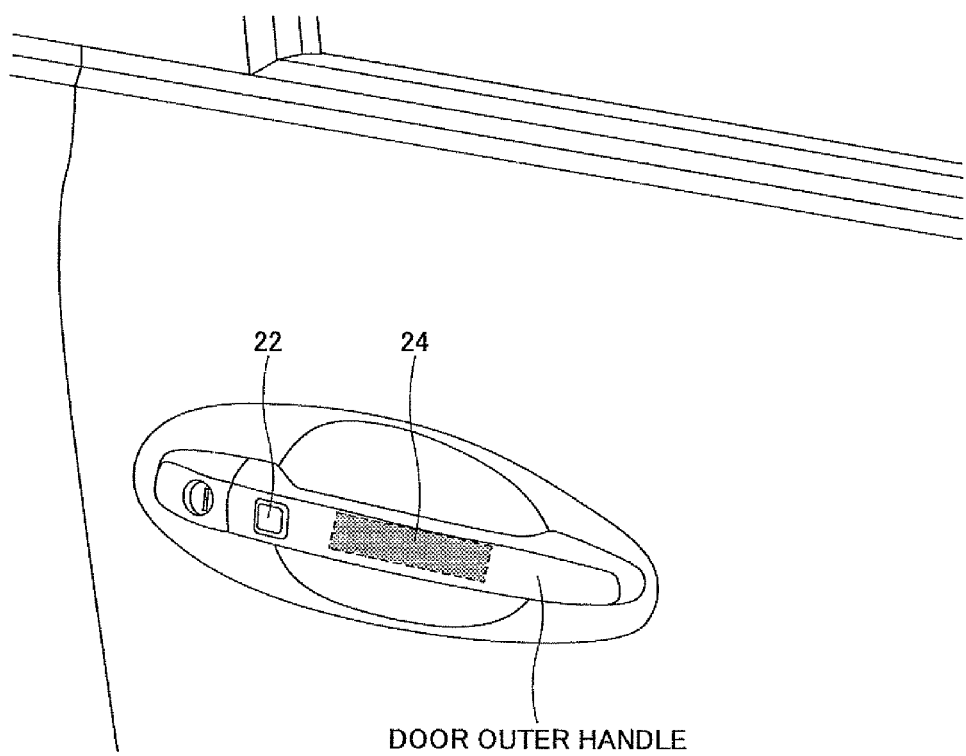
FIG. 2 is a diagram for illustrating an example of a lock switch 22 and a touch sensor 24.

The smart ECU 10 is connected to a lock switch 22 which turns on/off in response to the lock operation for locking the door, and a touch sensor 24 for detecting a touch operation of the door outer handle. The lock switch 22 and the touch sensor 24 may be provided near the door outer handle, as shown in FIG. 2. In this case, the touch sensor 24 may be disposed in such a manner that it detects the touch on a back side of the door outer handle.

The smart ECU 10 is connected to a body ECU 32 via a bidirectional multiplex transmission line 30. The body ECU 32 is connected to a door lock actuator 34 for driving a door lock mechanism. The door lock actuator 34 switches the door lock mechanism to selectively form a door locked state or a door unlocked state according to a control signal from the body ECU 32.

Next, a summary of an example of a fundamental door lock/unlock operation performed in cooperation by the smart ECU 10 and the body ECU 32 according to the embodiment is described.

[Unlock of Door Lock Mechanism]

Figure 3:
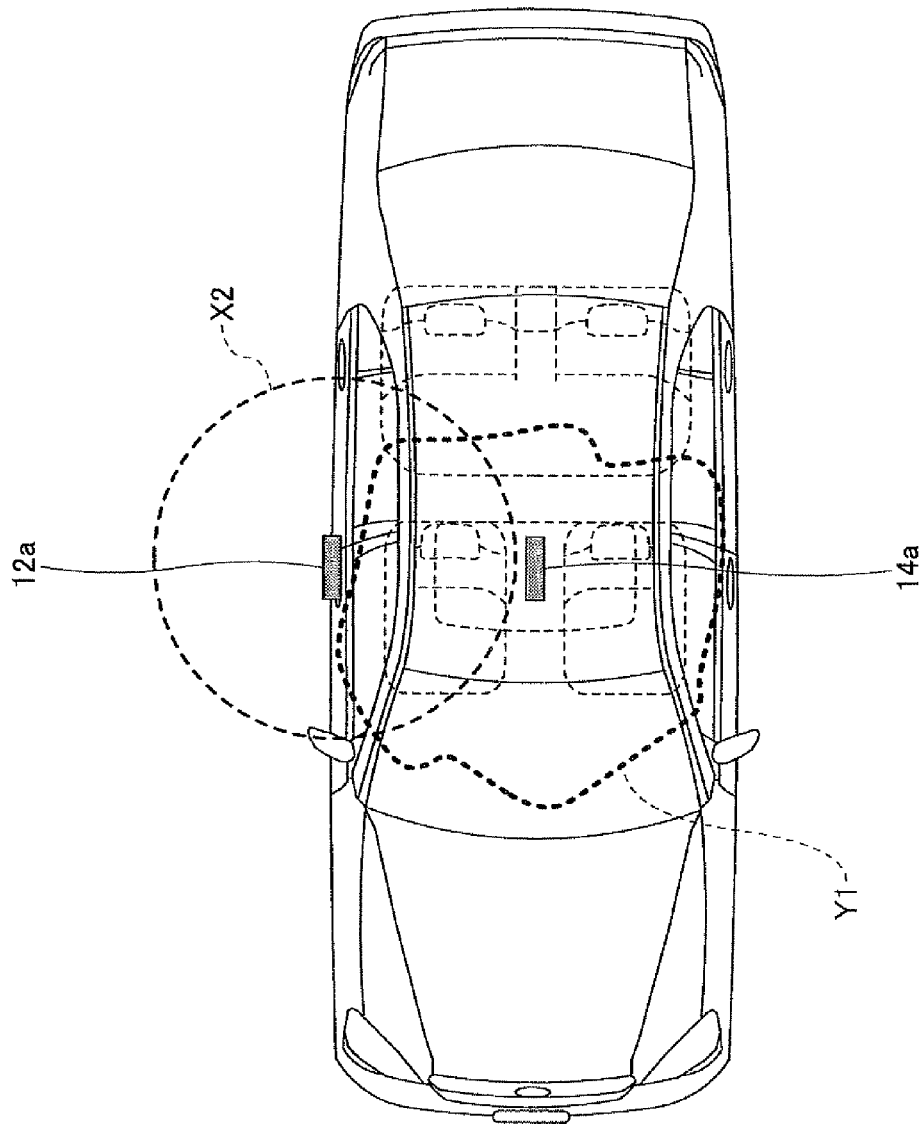
FIG. 3 is a diagram for illustrating an example of a detection area, etc., of an antenna 14a for detection of a key in a cabin.

When a predetermined parked status of the vehicle is detected, the smart ECU 10 transmits the request signal via the outside key detecting transmitters 12 and the outside key detecting antennas 12*a* to form the predetermined detection area outside the cabin of the vehicle. The predetermined detection area may be such an area as indicated by X2 in FIG. 3, for example. If the electronic key 40 exists in the detection area, the receiver 18 receives the response signal from the electronic key 40. The smart ECU 10 detects an approach of the electronic key 40 with a valid ID code toward the vehicle by verifying the ID code included in the response signal received by the receiver 18 against the ID code predetermined and stored in advance. If the verification of the ID code is obtained, the body ECU 32 supplies the door lock actuator of the corresponding door lock mechanism with a driver signal for an unlock operation when the body ECU 32 detects a predetermined operation by the user which represents the intention of the user to open the door (for example, when the touch sensor 24 detects a contact status or a closer relationship between a hand of the user and the door outer handle). As a result, the door unlock status is formed, and thus the user having the valid electronic key 40 can open a desired door and ride in the vehicle without inserting the electronic key 40 into a key cylinder by hand or operating a switch of the electronic key 40. Hereafter, the unlock operation thus implemented using the smart key system is also referred to as "smart unlock operation". On the other hand, the unlock operation implemented using an ordinary keyless entry system (unlock instruction by a switch operation) is also referred to as "wireless unlock operation". It is noted that the unlock operation other than the smart unlock operation and the wireless unlock operation typically includes a key interlocked unlock operation which is implemented typically when the user inserts the electronic key 40 into the door key cylinder by hand and rotates it.

It is noted that when the door opening operation by the user is detected (i.e., the output of the door courtesy switch 26 changes from OFF to ON) after the smart lock or wireless unlock operation, the smart ECU 10 transmits the request signal via the inside key detecting transmitters 14 and the inside key detecting antennas 14*a* to form the predetermined detection area inside the cabin of the vehicle. The predetermined detection area may cover an area in which the user carrying the electronic key 40 may exist in an ordinary situation or an area within which the user places the electronic key 40 in an ordinary situation, such as an area indicated by Y1 in FIG. 3, for example. The electronic key 40 in the predetermined detection area transmits the response signal in response to the request signal and the response signal is received by the receiver 18. Therefore, if the request signal is received by the receiver 18 and the key certification is granted (i.e., the encryption codes corresponds to each other), the smart ECU 10 determines that the electronic key 40 (the valid user) exists in the cabin of the vehicle, and thus deactivates an immobilizer function, releases a steering wheel lock and forms a status in which an engine start is available by an operation of an engine switch (not shown). Hereafter, such process for detecting the existence of the electronic key 40 in the cabin of the vehicle is also referred to as "ordinary in-cabin key certification process", in order to avoid confusion with a similar process described later. It is noted that the deactivation of the immobilizer function, the release of the steering wheel lock, etc., may implemented directly in response to the change in the output of the door courtesy switch 26 from OFF to ON, bypassing the ordinary in-cabin key certification process.

[Lock of Door Lock Mechanism, Etc.]

The smart ECU 10 detects a press operation of the lock switch 22 arranged in, the door outer handle. When the press operation of the lock switch 22 is detected, the smart ECU 10 transmits the request signal via the outside key detecting transmitters 12 and the outside key detecting antennas 12a to form the predetermined detection area outside the vehicle. The predetermined detection area may be such an area as indicated by X2 in FIG. 3, for example. If the electronic key 40 exists in the detection area, the receiver 18 receives the response signal from the electronic key 40. The smart ECU 10 detects the fact that the electronic key 40 with a valid ID code is brought outside the vehicle, by verifying the ID code included in the response signal received by the receiver 18 against the ID code predetermined and stored in advance. When the certification of the ID code is granted, the smart ECU 10 supplies the door lock actuator 34 of the door lock mechanism in the unlocked status with a driver signal for a lock operation. As a result, the door locked state is formed, and thus the user having the valid electronic key 40 can lock the doors without inserting the electronic key 40 into the key cylinder by hand or operating the switch of the electronic key 40. Hereafter, the lock operation thus implemented using the smart key system is also referred to as "smart lock operation". On the other hand, the lock operation implemented using an ordinary keyless entry system (lock instruction by a switch operation) is also referred to as "wireless lock operation". It is noted that the lock operation other than the smart lock operation and the wireless lock operation typically includes a key interlocked lock operation which is implemented typically when the user inserts the electronic key 40 into the door key cylinder by hand and rotates it.

[Process for Detecting an Abnormality of a Door Courtesy Switch]

Next, a process for detecting an abnormality of a door courtesy switch 26 performed in cooperation by the smart ECU 10 and the body ECU 32 according to the embodiment is described.

Figure 4:
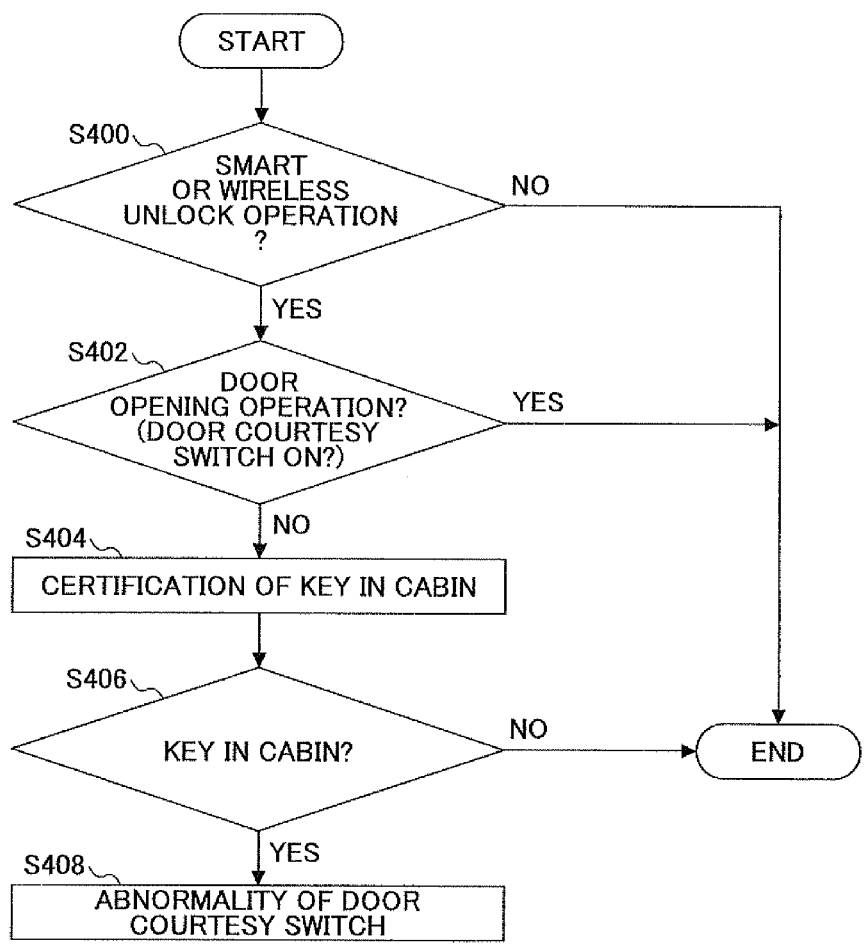
FIG. 4 is a flowchart of an example of a process for detecting an abnormality of a door courtesy switch 26 performed by a smart ECU 10 in concert with a body ECU 32.

FIG. 4 is a flowchart of an example of a process for detecting an abnormality of the door courtesy switch 26 performed by the smart ECU 10 in concert with the body ECU 32. The process routine shown in FIG. 4 may be initiated when the door unlock operation occurs. It is noted the following steps may be performed by any one of the smart ECU 10 and the body ECU 32 or both of the smart ECU 10 and the body ECU 32 in cooperation unless otherwise specified.

In step 400, it is determined whether the door unlock operation is the smart door unlock or the wireless door unlock. In other words, it is determined whether the door unlock operation is performed by wireless signals without the key interlocked unlock operation. If it is determined that the door unlock operation is the smart door unlock or the wireless door unlock, the process routine goes to step 402. Otherwise (i.e., if the door unlock operation is the key interlocked unlock operation or the like), the process routine terminates without performing any further process because it is not possible to precisely detect an abnormality of the door courtesy switch 26 at this time of the door unlock operation.

In step 402, it is determined whether any door is opened. In other words, it is determined whether the output of any door courtesy switch 26 changes from OFF to ON. If it is determined that the output of any door courtesy switch 26 changes from OFF to ON, the process routine terminates, determining that there is no abnormality of the door courtesy switch 26. On the other hand, if the output of any door courtesy switch 26 doesn't change from OFF to ON, the process routine goes to step 404. It is noted that in an alternative embodiment, in step 402, if the output of any door courtesy switch 26 doesn't change from OFF to ON within a predetermined time after the door unlock operation, the process routine goes to step 404. In this case, the predetermined time may correspond to a normal time period from the door unlock operation to the door opening operation by the user, and the predetermined time in the case of the wireless unlock operation may be longer than that in the case of the smart lock operation.

In step 404, a key certification in the cabin is performed. Specifically, the smart ECU 10 transmits the request signal via the inside key detecting transmitters 14 and the inside key detecting antennas 14a to form the predetermined detection area inside the vehicle. The predetermined detection area may cover an area in which the user carrying the electronic key 40 may exist in an ordinary situation or an area within which the user places the electronic key 40 in an ordinary situation, such as an area indicated by Y1 in FIG. 3, for example. However, the predetermined detection area may be enlarged or downsized with respect to the predetermined detection area at the ordinary in-cabin key certification process.

In step 406, the smart ECU 10 determines whether the electronic key 40 exists in the cabin of the vehicle. If the electronic key 40 exists in the predetermined detection area Y1 (i.e., if the user exists in the cabin of the vehicle), the electronic key 40 transmits, in response to the request signal, the response signal which is received by the receiver 18. If the electronic key 40 does not exist in the predetermined detection area Y1, the receiver 18 receives no response signal. Therefore, the smart ECU 10 may determine whether the electronic key 40 exists in the cabin of the vehicle based on the presence or absence of the reception of the response signal from the electronic key 40. Alternatively, if the response signal is received by the receiver 18 and the key certification is granted (i.e., the encryption codes corresponds to each other), the smart ECU 10 may determine that the electronic key 40 exists in the cabin of the vehicle, and if the response signal is not received by the receiver 18 or the key certification is not granted, the smart ECU 10 may determine that the electronic key 40 doesn't exist in the cabin of the vehicle. In any case, if it is determined that the electronic key 40 exists in the cabin of the vehicle, the process routine goes to step 408. On the other hand, if it is determined that the electronic key 40 doesn't exist in the cabin of the vehicle, the process routine terminates, determining that there is no abnormality of the door courtesy switch 26.

In step 408, it is determined that there is an abnormality in any door courtesy switch 26. This is because such a situation in which the electronic key 40 exists in the cabin of the vehicle in spite of the fact that there is no door opening operation that occurred naturally, and therefore it can be determined with high possibility that there is an abnormality in any door courtesy switch 26 (i.e., an abnormality which causes the door courtesy switch 26 not to turn on in a situation where the door courtesy switch 26 should turn on). In this case, a signal (i.e., diagnostics) representing the abnormality of the door courtesy switch 26 may be generated. This signal may include additional information such as information as to the time of occurrence of the abnormality, etc. It is noted that if it is determined that there is an abnormality in any door courtesy switch 26, various determination processes which otherwise would be triggered to initiate by the ON operation of the door courtesy switch 26 (such as an ordinary in-cabin key certification process for deactivation of the immobilizer function, for example) may be triggered to initiate even if the door courtesy switch 26 doesn't turn on by temporarily modifying their initiation condition.

In this way, according to the process shown in FIG. 4, an abnormality in any door courtesy switch 26 is detected by utilizing the consideration that such a situation in which the electronic key 40 enters into the cabin of the vehicle without no door opening operation being detected could not occur naturally when the door courtesy switch 26 is normal. With this arrangement, it is possible to precisely detect not only a permanent abnormality (generated as tendency) of the door courtesy switch 26 but also a temporal abnormality of the door courtesy switch 26 (a temporal abnormality due to a foreign substance involved or a hardening of grease at low temperature, for example).

Figure 5:
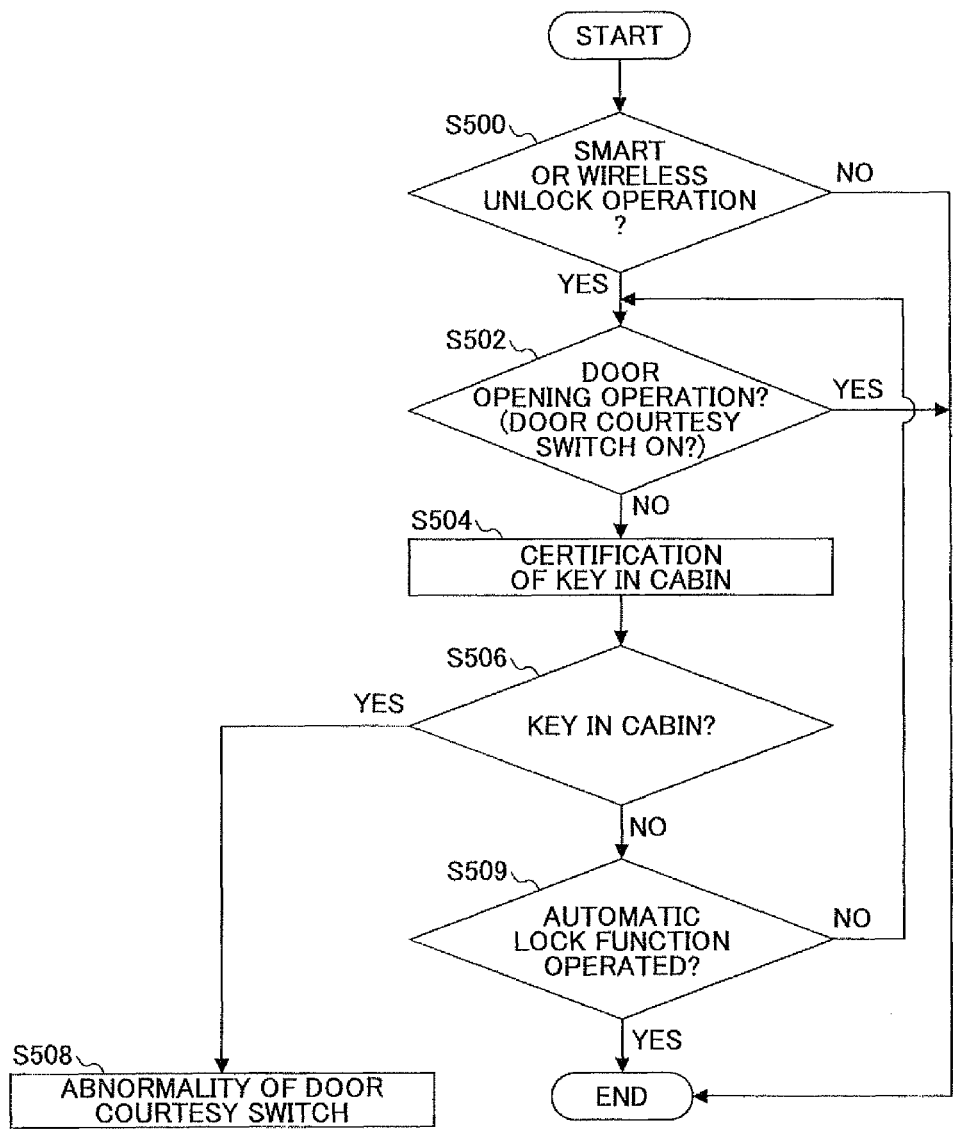
FIG. 5 is a flowchart of another example of a process for detecting an abnormality of a door courtesy switch 26 performed by a smart ECU 10 in concert with a body ECU 32.

FIG. 5 is a flowchart of another example of a process for detecting an abnormality of a door courtesy switch 26 performed by the smart ECU 10 in concert with the body ECU 32. The process routine shown in FIG. 5 may be initiated when the door unlock operation occurs, and may be executed repeatedly every predetermined period. It is noted the following steps may be performed by any one of the smart ECU 10 and the body ECU 32 or both of the smart ECU 10 and the body ECU 32 in cooperation unless otherwise specified.

The processes in steps 500-508 shown in FIG. 5 are the same as the processes in steps 400-408 shown in FIG. 4, and therefore an explanation of them is omitted.

The process routine shown in FIG. 5 goes to step 509, if it is determined in step 506 that the electronic key 40 doesn't exist in the cabin of the vehicle.

In step 509, it is determined whether an automatic lock function is operated. The automatic lock function is a function which automatically performs the door lock operation via the door lock actuator 34 if there is no door opening operation within a predetermined time period ΔT after the door lock is released by the door unlock operation (an operation of the touch sensor 34, for example) under a situation where the key certification of the electronic key 40 is granted. Typically, the predetermined time period ΔT is determined in terms of crime prevention and customer convenience. For example, the predetermined time period may be a fixed time such as 30 sec or a variable time selected by the user.

In this step 509, if the automatic lock function is operated without determining that the electronic key 40 exists in the cabin of the vehicle, that is to say, if the predetermined time period ΔT has passed after the door unlock operation (i.e., after the smart unlock operation or the wireless unlock operation), the process routine terminates, determining that there is no abnormality of the door courtesy switch 26. It is noted that such a situation can be imaged when the user outside the vehicle performs the wireless unlock operation by inadvertently (unintentionally) operating the switch of the electronic key 40. On the other hand, if the automatic lock function is not operated, that is to say, if the predetermined time period ΔT has not yet passed after the door unlock operation, the process routine returns to step 502 for the processes at the next period.

In this way, according to the process shown in FIG. 5, as is the case with the process shown in FIG. 4, it is possible to precisely detect not only a permanent abnormality of the door courtesy switch 26 but also a temporal abnormality of the door courtesy switch 26 (a temporal abnormality due to a foreign substance involved or a hardening of grease at low temperature, for example). Further, since the presence or absence of the electronic key 40 in the cabin of the vehicle is monitored continuously until the automatic lock function is operated, the determination accuracy (i.e., reliability) of the abnormality of the door courtesy switch 26 improves.

It is noted that in an alternative embodiment of the process shown in FIG. 5, the operation of the automatic lock function may be delayed if it is determined that the electronic key 40 exists in the cabin of the vehicle. In other words, the predetermined time period ΔT may be extended if it is determined that the electronic key 40 exists in the cabin of the vehicle. With this arrangement, the extended time increases a possibility that the door is not automatically locked yet when the user returns to the vehicle, and thus increases a possibility that the key trapped situation due to the abnormality of the door courtesy switch 26 can be prevented. However, it is desired that the extended amount of the predetermined time period ΔT is set to an appropriate time (for example, from 30 sec to 5 minutes) which doesn't decrease crime prevention character largely.

Figure 6:
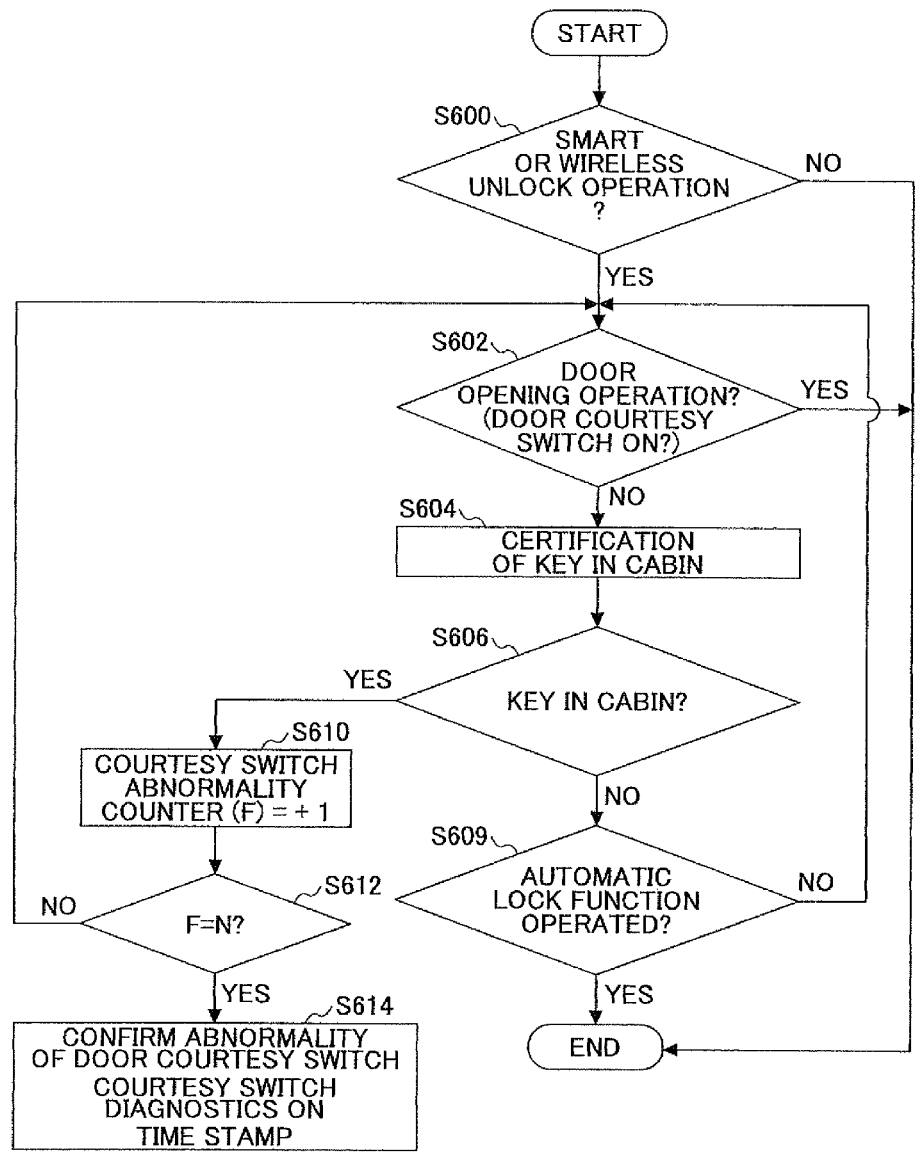
FIG. 6 is a flowchart of yet another example of a process for detecting an abnormality of a door courtesy switch 26 performed by a smart ECU 10 in concert with a body ECU 32.

FIG. 6 is a flowchart of yet another example of a process for detecting an abnormality of a door courtesy switch 26 performed by a smart ECU 10 in concert with a body ECU 32. The process routine shown in FIG. 6 may be initiated when the door unlock operation occurs, and may be executed repeatedly every predetermined period. It is noted the following steps may be performed by any one of the smart ECU 10 and the body ECU 32 or both of the smart ECU 10 and the body ECU 32 in cooperation unless otherwise specified.

The processes in steps 600-608 shown in FIG. 6 are the same as the processes in steps 400-408 shown in FIG. 4, and the process in step 609 shown in FIG. 6 is the same as the process step 509 shown in FIG. 5. Therefore, an explanation of them is omitted.

The process routine shown in FIG. 6 goes to step 610, if it is determined in step 606 that the electronic key 40 exists in the cabin of the vehicle. On the other hand, the process routine shown in FIG. 6 goes to step 609, if it is determined in step 606 that the electronic key 40 doesn't exist in the cabin of the vehicle.

In step 610, a courtesy switch abnormality counter F is incremented by 1. It is noted that the initial value of the courtesy switch abnormality counter may be zero.

In step 612, it is determined whether the courtesy switch abnormality counter F becomes a predetermined value N. If it is determined that the courtesy switch abnormality counter F is greater than or equal to the predetermined value N, the process routine goes to step 614. On the other hand, the process routine returns to step 602, if it is determined that the courtesy switch abnormality counter F is less than the predetermined value N.

In step 614, it is confirmed that there is an abnormality in any door courtesy switch 26. In this case, a courtesy switch diagnostics is turned ON and is given a time stamp. With this arrangement, it becomes easier to analyze the abnormality afterward.

In this way, according to the process shown in FIG. 6, as is the case with the process shown in FIG. 4, it is possible to precisely detect not only a permanent abnormality of the door courtesy switch 26 but also a temporal abnormality of the door courtesy switch 26 (a temporal abnormality due to a foreign substance involved or a hardening of grease at low temperature, for example). Further, since the abnormality is not confirmed until the abnormality of the door courtesy switch 26 is detected predetermined times (N), it is possible to distinguish between the permanent abnormality of the door courtesy switch 26 and the temporal abnormality of the door courtesy switch 26. For example, it is possible to output the different diagnostics by additionally considering a condition of a time period. Specifically, if the courtesy switch abnormality counter F is greater than or equal to the predetermined value N within a certain time period, it may be determined that there is a permanent abnormality or a sign of a failure (a kind of an abnormality) in any door courtesy switch 26, while otherwise, it may be determined that there is temporal abnormality in any door courtesy switch 26.

Figure 7:
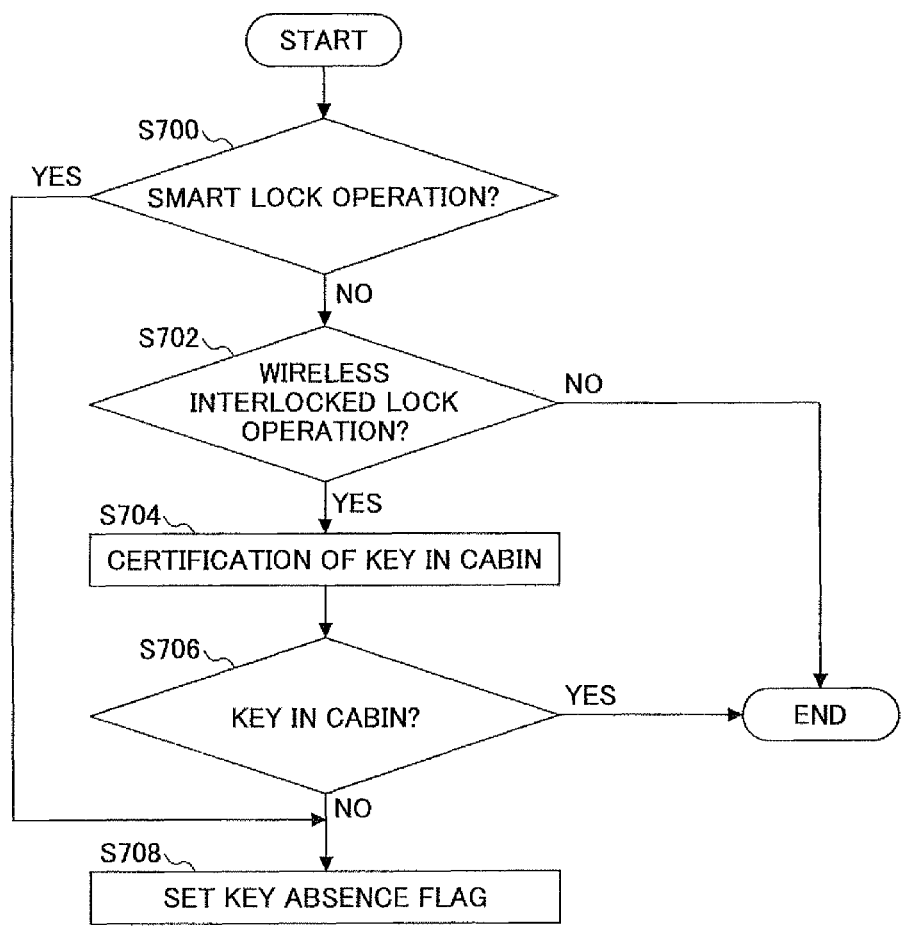
FIG. 7 is a flowchart of an example of a preferred pre-process for performing the process for detecting an abnormality of a door courtesy switch 26 according to the present embodiment.

FIG. 7 is a flowchart of an example of a preferred pre-process for performing the process (shown in FIGS. 4-6) for detecting an abnormality of the door courtesy switch 26 according to the present embodiment. The process shown in FIG. 7 is a process for detecting a door locked state in which the electronic key 40 doesn't exist in the cabin of the vehicle. The process routine shown in FIG. 7 may be initiated when the door lock operation occurs. It is noted the following steps may be performed by any one of the smart ECU 10 and the body ECU 32 or both of the smart ECU 10 and the body ECU 32 in cooperation unless otherwise specified.

In step 700, it is determined whether the door lock operation is a smart lock operation. If it is determined that the door lock operation is a smart lock operation, the process routine goes to step 708 because it can be determined that the electronic key 40 doesn't exist in the cabin of the vehicle (i.e., the electronic key 40 exists outside the vehicle). Otherwise (i.e., if the door lock operation is a key interlocked lock operation, a wireless lock operation or the like), the process routine goes to step 702.

In step 702, it is determined whether the door lock operation is a key interlocked lock operation or a wireless lock operation. If it is determined that the door lock operation is a key interlocked lock operation or a wireless lock operation, the process routine goes to step 704. Otherwise (for example, in the case of such a door lock operation which is implemented by extending the hand through the opened window into the cabin of the vehicle and operating a lock switch in the cabin of the vehicle), the process routine terminates without performing any further process because it is not possible to precisely detect the door locked state in which the electronic key 40 doesn't exist in the cabin of the vehicle.

In step 704, a key certification in the cabin is performed. Specifically, the smart ECU 10 transmits the request signal via the inside key detecting transmitters 14 and the inside key detecting antennas 14*a* to form the predetermined detection area inside the vehicle. The predetermined detection area may cover an area in which the user carrying the electronic key 40 may exist in an ordinary situation or an area within which the user places the electronic key 40 in an ordinary situation, such as an area indicated by Y1 in FIG. 3, for example. However, the predetermined detection area may be enlarged or downsized with respect to the predetermined detection area at the ordinary in-cabin key certification process.

In step 706, the smart ECU 10 determines whether the electronic key 40 exists in the cabin of the vehicle. If the electronic key 40 exists in the cabin of the vehicle (i.e., if the user exists in the cabin of the vehicle), the electronic key 40 transmits, in response to the request signal, the response signal which is received by the receiver 18. If the electronic key 40 does not exist in the predetermined detection area Y1, the receiver 18 receives no response signal. Therefore, the smart ECU 10 may determine whether the electronic key 40 exists in the cabin of the vehicle based on the presence or absence of the reception of the response signal from the electronic key 40. Alternatively, if the response signal is received by the receiver 18 and the key certification is granted (i.e., the encryption codes corresponds to each other), the smart ECU 10 may determine that the electronic key 40 exists in the cabin of the vehicle, and if the response signal is not received by the receiver 18 or the key certification is not granted, the smart ECU 10 may determine that the electronic key 40 doesn't exist in the cabin of the vehicle. In any case, if it is determined that the electronic key 40 doesn't exist in the cabin of the vehicle, the process routine goes to step 708. On the other hand, if it is determined that the electronic key 40 exists in the cabin of the vehicle, the process routine terminates, determining that it is not a door locked state in which the electronic key 40 doesn't exist in the cabin of the vehicle.

In step 708, the smart ECU 10 determines that it is a door locked state in which the electronic key 40 doesn't exist in the cabin of the vehicle, and sets a flag (a key absence flag) representing such a state. The key absence flag is cleared when the door unlock operation is detected afterward, for example. The process (shown in FIGS. 4-6) for detecting an abnormality of the door courtesy switch 26 according to the present embodiment may be initiated only when the door unlock operation is detected in a state in which the key absence flag is set.

Here, in the case of the wireless lock operation and the key interlocked lock operation other than the smart lock operation, it is possible to form the door locked state while leaving the electronic key 40 in the cabin of the vehicle. If the aforementioned process for detecting an abnormality of the door courtesy switch 26 is performed in such a door locked state, there may be a case where an abnormality of the door courtesy switch 26 is detected in error. Therefore, if the logic shown in FIG. 7 is added, and the aforementioned process for detecting an abnormality of the door courtesy switch 26 is performed only when it is detected that the door locked state in which the electronic key 40 doesn't exist in the cabin of the vehicle is formed, it is possible to increase accuracy in detecting an abnormality of the door courtesy switch 26.

The present invention is disclosed with reference to the preferred embodiments. However, it should be understood that the present invention is not limited to the above-described embodiments, and variations and modifications may be made without departing from the scope of the present invention.

For example, although in the foregoing the door courtesy switch 26 is not made clear about which of the door courtesy switches provided in the respective doors and the luggage door is indicated, the door courtesy switch 26 in the foregoing may be a predetermined one or any one of the door courtesy switches provided in the respective doors except for the luggage door, or may be a predetermined one or any one of the door courtesy switches provided in the respective doors and the luggage door.

Further, although in the foregoing two ECUs, that is to say, the smart ECU 10 and the body ECU 32 are used, a part of the above-mentioned functions of the smart ECU 10 and the body ECU 32 may be implemented by other ECU(s), or the above-mentioned functions of the smart ECU 10 and the body ECU 32 may be implemented by one ECU. Further, the above-mentioned respective functions of the smart ECU 10 and the body ECU 32 are only exemplary, and the functions of one of the smart ECU 10 and the body ECU 32 may be implemented by another.

The invention claimed is:

1. A door courtesy switch abnormality detection apparatus for use in an on-vehicle system having a door courtesy switch in which a door unlocked status is determined based on a wireless signal transmitted from an electronic key, said apparatus comprising:
    an unlock detector configured to detect a door unlock operation;
    a door open/close operation detector configured to detect door open and close operations based on an ON/OFF signal from the door courtesy switch;
    a smart electronic control unit and a body electronic control unit configured to generate information identifying a presence of an abnormality in the door courtesy switch; and
    the smart electronic control unit being configured to determine whether the electronic key exists in a cabin of a vehicle based on a status of a radio wave transmitted from the electronic key under a situation where the door open operation is not detected by the door open/close operation detector, if the door unlock operation is detected by the unlock detector,
    wherein:
        the smart electronic control unit and the body electronic control unit: (i) generate the information identifying the presence of the abnormality in the door courtesy switch when it is determined that the electronic key exists in the cabin of the vehicle and a door open operation after a door unlock operation is not detected by the door open/close operation detector, and (ii) not generate the information identifying the presence of the abnormality in the door courtesy switch when it is determined that the electronic key exists in the cabin of the vehicle and the door open operation is detected after a door unlock operation by the door open/close operation detector.

2. The door courtesy switch abnormality detection apparatus as claimed in claim 1, wherein
    said apparatus is installed in a vehicle having an automatic lock function in which a door lock operation is performed automatically when the door open operation is not detected within a predetermined time after a door unlock operation is performed, and
    the smart electronic control unit performs the determination within the predetermined time.

3. The door courtesy switch abnormality detection apparatus as claimed in claim 1, wherein the unlock detector detects the door unlock operation in response to a door unlock command based on a wireless signal transmitted from the electronic key.

4. The door courtesy switch abnormality detection apparatus as claimed in claim 1, wherein the smart electronic control unit and the body electronic control unit generate the information representing the abnormality in the door courtesy switch if it is determined by the smart electronic control unit that the electronic key exists in the cabin of the vehicle more than a predetermined number of times.

5. The door courtesy switch abnormality detection apparatus as claimed in claim 1, further comprising:
    a lock detector configured to detect a door lock operation; and
    the smart electronic control unit being further configured to determine whether the electronic key exists in the cabin of the vehicle based on a status of a radio wave transmitted from the electronic key if the door lock operation is detected by the lock detector,
    wherein the smart electronic control unit performs the determination if the door unlock operation is detected by the unlock detector in a door locked situation where it is determined by the smart electronic control unit that the electronic key does not exist in the cabin of the vehicle.

6. An on-vehicle system for use with a vehicle having a function of detecting an abnormality in a door courtesy switch, comprising:
    the door courtesy switch;
    an antenna having a detection area thereof within a cabin of the vehicle; and
    an electronic control apparatus including:
        an unlock detector configured to detect a door unlock operation;
        a door open/close operation detector configured to detect door open and close operations from the door courtesy switch;
        a smart electronic control unit configured to determine whether the electronic key exists in a cabin of a vehicle based on a status of a response signal transmitted from the electronic key, said response signal responding to a signal transmitted from the antenna; and
        a body electronic control unit configured to generate information identifying a presence of an abnormality in the door courtesy switch;
    wherein the smart electronic control unit performs the determination in response to an ON/OFF signal of the door courtesy switch being not inverted after the door unlock operation is detected by the unlock detector, and
    the smart electronic control unit and the body electronic control unit: (i) generate the information representing the abnormality in the door courtesy switch when it is determined that the electronic key exists in the cabin of the vehicle and a door open operation after the door unlock operation is not detected by the door open/close operation detector, and (ii) not generate the information identifying the presence of the abnormality in the door courtesy switch when it is determined that the electronic key exists in the cabin of the vehicle and the door open operation is detected after a door unlock operation by the door open/close operation detector.

7. The on-vehicle system as claimed in claim 6, further comprising:
    the body electronic control unit being further configured to perform a door lock operation if the ON/OFF signal of the door courtesy switch is not inverted within a predetermined time after the door unlock operation is detected by the unlock detector, wherein
    the smart electronic control unit performs the determination within the predetermined time.

8. The on-vehicle system as claimed in claim 7, wherein the body electronic control unit being further configured to extend the predetermined time if it is determined by the smart electronic control unit that the electronic key exists in the cabin of the vehicle.

9. A door courtesy switch abnormality detection method for use in an on-vehicle system having a door courtesy switch and in which a door unlocked status is determined based on a wireless signal transmitted from an electronic key, said method comprising:
    an unlock detecting step of detecting a door unlock operation;
    a door open operation detecting step of detecting a door open operation based on an ON/OFF signal from the door courtesy switch if the door unlock operation is detected in the unlock detecting step;

a determining step of determining whether the electronic key exists in a cabin of a vehicle based on a status of a radio wave transmitted from the electronic key in response to the door open operation being not detected in the door open operation detecting step; and an information generating step of generating information identifying: (i) a presence of an abnormality in the door courtesy switch when it is determined in the determining step that the electronic key exists in the cabin of the vehicle by an antenna having a detection area thereof within the cabin of the vehicle and a door open operation after the door unlock operation is not detected, or (ii) an absence of the abnormality in the door courtesy switch when it is determined that the electronic key exists in the cabin of the vehicle and the door open operation is detected after a door unlock operation.

10. A door courtesy switch abnormality detection apparatus for use in a vehicle having a door courtesy switch, an antenna having a detection area thereof within a cabin of the vehicle, and in which a door unlocked status is determined based on a wireless signal transmitted from an electronic key, the door courtesy switch abnormality detection apparatus comprising:

a processor programmed to:

detect a door unlock operation;

detect door open and close operations from the door courtesy switch;

detect a presence of the electronic key in a cabin of the vehicle; and generate information identifying: (i) a presence of an abnormality in the door courtesy switch when the electronic key is detected in the cabin of the vehicle by the antenna, in response to an ON/OFF signal of the door courtesy switch being not inverted after a door unlock operation is detected such that a door open operation after the door unlock operation is not detected, or (ii) an absence of the abnormality in the door courtesy switch when it is determined that the electronic key exists in the cabin of the vehicle and the door open operation is detected after a door unlock operation.

11. The door courtesy switch abnormality detection apparatus as claimed in claim 1, wherein the smart electronic control unit and the body electronic control unit generate a diagnostic signal that includes information representing a time of occurrence of the abnormality.

* * * * *